United States Patent
Poisson et al.

(10) Patent No.: US 11,946,752 B2
(45) Date of Patent: Apr. 2, 2024

(54) LOCAL SUPERVISION MODULE FOR A SUPERVISION INFRASTRUCTURE OF A MULTIMODAL TERRESTRIAL TRANSPORT NETWORK

(71) Applicant: ALSTOM HOLDINGS, St Ouen sur Seine (FR)

(72) Inventors: Pascal Poisson, Sceaux (FR); Manel Abid, Paris (FR); Lionel Scremin, Caluire-Et-Cuire (FR)

(73) Assignee: ALSTOM HOLDINGS, Saint-Ouen-sur-Seine (FR)

( * ) Notice: Subject to any disclaimer, the term of this patent is extended or adjusted under 35 U.S.C. 154(b) by 98 days.

(21) Appl. No.: 17/631,153

(22) PCT Filed: Jul. 29, 2020

(86) PCT No.: PCT/EP2020/071394
§ 371 (c)(1),
(2) Date: Jan. 28, 2022

(87) PCT Pub. No.: WO2021/018960
PCT Pub. Date: Feb. 4, 2021

(65) Prior Publication Data
US 2022/0357165 A1 Nov. 10, 2022

(30) Foreign Application Priority Data
Jul. 29, 2019 (FR) ...................................... 19 08623

(51) Int. Cl.
*G01C 21/34* (2006.01)
(52) U.S. Cl.
CPC ................ *G01C 21/3423* (2013.01)

(58) Field of Classification Search
CPC .... G01C 21/3423; G06Q 10/04; G06Q 50/30; G08G 1/127
See application file for complete search history.

(56) References Cited

U.S. PATENT DOCUMENTS

2018/0308064 A1* 10/2018 Glaser ................ G01C 21/3484

FOREIGN PATENT DOCUMENTS

| EP | 3206199 A1 * | 2/2017 |
| EP | 3206199 A1 | 8/2017 |

OTHER PUBLICATIONS

French Search Report issued for French Patent Application No. 1908623, dated Apr. 30, 2020 in 2 pages.
(Continued)

*Primary Examiner* — Brian P Sweeney
(74) *Attorney, Agent, or Firm* — Knobbe, Martens, Olson & Bear, LLP

(57) ABSTRACT

A multimodal terrestrial transport network (1) includes first and second networks (L1, L5), each of which is equipped with an operating system (SE1, SE2). The module (63) according to the invention is associated with an interchange station (H3) where the first and second networks are interconnected. It includes: an interface (83) for communicating with the operating systems of the first and second networks; means (84) for providing an overview of the traffic in a monitoring area (DS3) covering part of the first and second networks in order to update the overview data based on traffic data provided by the operating systems, and an engine (87) for executing operating rules based on the overview data and suited to generate instructions suited to modify the traffic within a control area (DC3).

7 Claims, 3 Drawing Sheets

(56) References Cited

OTHER PUBLICATIONS

International Search Report issued for International Patent Application No. PCT/EP2020/071394, dated Oct. 22, 2020 in 5 pages.

\* cited by examiner

LOCAL SUPERVISION MODULE FOR A SUPERVISION INFRASTRUCTURE OF A MULTIMODAL TERRESTRIAL TRANSPORT NETWORK

CROSS-REFERENCE TO RELATED APPLICATIONS

This application is the U.S. National Phase under 35. U.S.C. § 371 of International Application PCT/EP2020/071394, filed Jul. 29, 2020, which claims priority to French Patent Application No. 1908623, filed Jul. 29, 2019. The disclosures of the above-described applications are hereby incorporated by reference in their entirety.

FIELD OF THE INVENTION

The invention concerns the field of local supervision modules for supervision infrastructure of a multimodal ground transport network.

BACKGROUND OF THE INVENTION

In urban centres, various public transport services are provided to users: rail, underground, tram, bus, etc. These services are managed independently from one another.

Herein, a monomodal network is a network on which vehicles of a single mode of transport and managed by a single owner operate, e.g. an underground, bus, tram, or rail network.

Generally, a monomodal network includes a centralised operating system that allows for the management of traffic on the network. An operating system uses a timetable to manage the circulation of each of the vehicles operating on the network.

A timetable defines the departure times from each station of a line of the network, the travel times between two consecutive stations of a line, stopping times in the stations, etc.

The timetable is dynamically updated over the course of the travel of the vehicles, taking into account operating information, e.g. the interval between two vehicles operating one after another on a line, the stopping time at a station required in order for transfers given the number of users present, etc.

A multimodal ground transport network is, by definition, a network including different monomodal networks and allowing a user to travel from a starting station to a destination station using one or more of the services provided by the monomodal networks. In particular, at an interchange station, a user may alight from a first vehicle operating on a first monomodal network in order to board a second vehicle operating on a second monomodal network in order to follow their route.

However, the various monomodal networks are not synchronised at the interchange stations of the multimodal network.

As such, it is difficult for users to minimise their travel times between a starting station and a destination station when their route includes a transfer.

Users may, for example, seek to plan their route by querying a database containing the scheduled arrival and departure times of the various vehicles operating on the various monomodal networks. However, because these networks are managed independently from one another, the scheduled arrival and departure times rarely correlate, which may result to a prolonged scheduled wait time at an interchange station.

Moreover, scheduled arrival and departure times are rarely complied with, such that, over a user's route, if the first vehicle is running on a delay, the second vehicle may have left the interchange station before the first one arrives. As such, users will miss their connection and are forced to await the next vehicle operating on the second network or take a different route. The actual wait times for users may thus be longer than planned.

Thus, even when they seek to optimise their routes, users are forced to use routes that will take longer. As a result, the perceived quality of service is suboptimal.

To avoid situations of this type caused by transport services that are managed independently of one another, there is thus a need for operational supervision at the level of the multimodal network.

SUMMARY OF THE INVENTION

The objective of the invention is thus to meet this need, inter alia, by proposing a local supervision module for supervision infrastructure of a multimodal ground transport network.

The invention concerns a local supervision module for supervision infrastructure of a multimodal ground transport network, wherein the multimodal terrestrial transport network includes at least one first monomodal network and a second monomodal network, wherein each of the first and second monomodal networks is equipped with an individual operating system, wherein the local supervision module is associated with an interchange station, where the lines of the first and second monomodal networks are interconnected so as to allow for the transfer of passengers between a first vehicle circulating on the first monomodal network and a second vehicle circulating on the second monomodal network, characterised in that it includes: an interface for communicating with the operating systems of the first and second monomodal networks; means for providing an overview of the traffic in a monitoring area associated with the local supervision module and covering the first and second monomodal networks at least around the interchange station, so as to update the overview data based on traffic data provided by the operating systems of the first and second monomodal networks, and an engine for executing operating rules based on the overview data and suited to generate at least one instruction including operating information so as to modify the traffic within a control area located within the monitoring area, wherein the communications interface transmits the instruction to one of the operating systems of the first and second monomodal networks.

The module according to the invention may include one or more of the following characteristics, taken alone or in all combinations technically possible:

The module includes an interface for communicating with a global supervision module for the supervision infrastructure so as to receive the operating rules to be executed by the operating engine of the module at the current time.

an operating rule consists of generating an instruction requiring a second vehicle to be held at the station until a first vehicle has arrived at the interchange station, provided that the hold time of the second vehicle does not exceed a latest departure time determined by a timetable according to which the operating system of the second monomodal network manages traffic on the second monomodal network.

An operating rule is a logical rule that is a function of at least one piece of overview data.

The module results from the configuration of a generic local supervision module as a function of the interchange station with which the module is associated.

The interchange station being associated with a monitoring area, the traffic data acquired by the module relate to events occurring within the monitoring area.

The monitoring area of the interchange station includes the interchange station and, for each track of the lines crossing at the interchange station, at least one station upstream of the interchange station and at least one station downstream of the interchange station in the direction of travel of the vehicles along the track.

The interchange station is associated with a control area, and the instructions generated by the module allow for the modification of the traffic within the control area.

The control area of the interchange station includes the interchange station and, for each track of the lines interconnected at the interchange station, at least one station upstream of the interchange station in the direction of travel of the vehicles along the track.

The control area associated with a module is included within the monitoring area associated with the module.

BRIEF DESCRIPTION OF THE DRAWINGS

The invention will be better understood based on the following description, which is provided by way of example only and without limitation, and by reference to the attached drawings, which show.

DETAILED DESCRIPTION OF THE PREFERRED EMBODIMENTS

Figure 1:
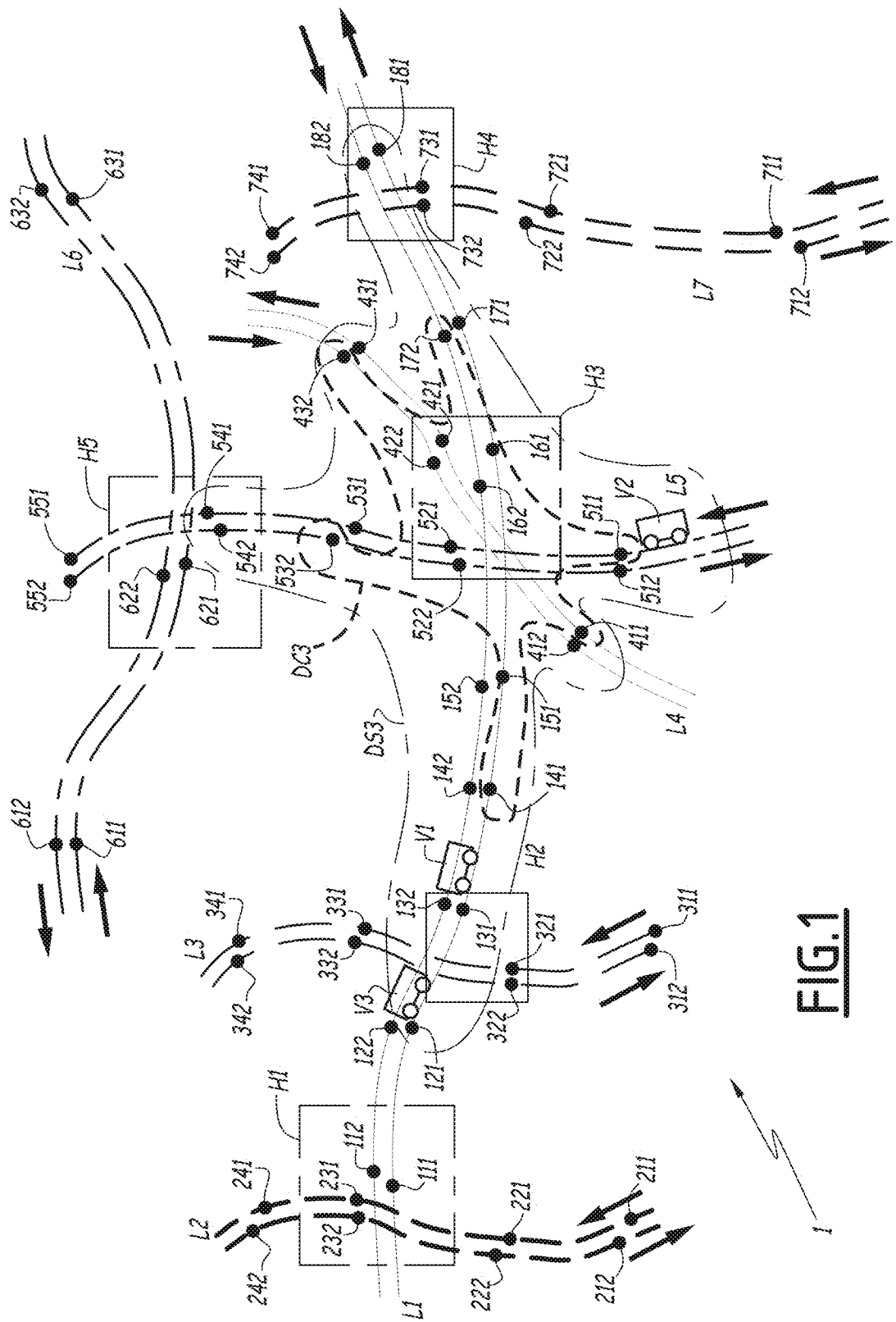
FIG. 1 is a schematic representation of a multimodal network.

FIG. 1 is a multimodal ground transport network 1. It includes a plurality of monomodal networks L1-L7. For the sake of clarity, each monomodal network here consists of a single line.

A line consists of two tracks, generally parallel to one another, with each track allowing for the movement of vehicles in one direction of travel (indicated by the arrows in FIG. 1).

Each monomodal network includes a plurality of stops for the transfer of passengers. For example, the network L1 includes the stops 111, 121, 131, 141, 151, 161, 171, and 181 along a first track, and the stops 112, 122, 132, 142, 152, 162, 172, and 182 along a second track.

Of the plurality of stations of the network 1, the interchange stations are stations common to at least two different monomodal networks in order to allow a user to transfer between these two monomodal networks. Thus, the stations H1-H5 are interchange or 'hub' stations.

In particular, the hub station H3, used more specifically infra, allows for transfer between the first monomodal network L1 (more specifically, the stops 161 and 162 thereof); the fourth monomodal network L4 (more specifically, the stops 421 and 422 thereof); and the fifth monomodal network L5 (more specifically, the stops 521 and 522).

Each monomodal network L1-L7 is equipped with a classical operating system allowing for dynamic operation of the vehicles. Such an operating system is suited to dynamically determine the timetables for each of the vehicles currently operating based, in particular, on operating information. Traditionally, such an operating system is an ATS (Automatic Train Supervision) system in the case of a monomodal underground or tram network, or an EAS (Exploitation Aided System) in the case of a monomodal bus network.

For example, where the first network L1 is an underground network, it is equipped with an ATS system, whilst, where the fourth network L4 is a bus network, it is equipped with an EAS system; and the fifth network L5, a tram network, is equipped with an ATS system.

Figure 2:
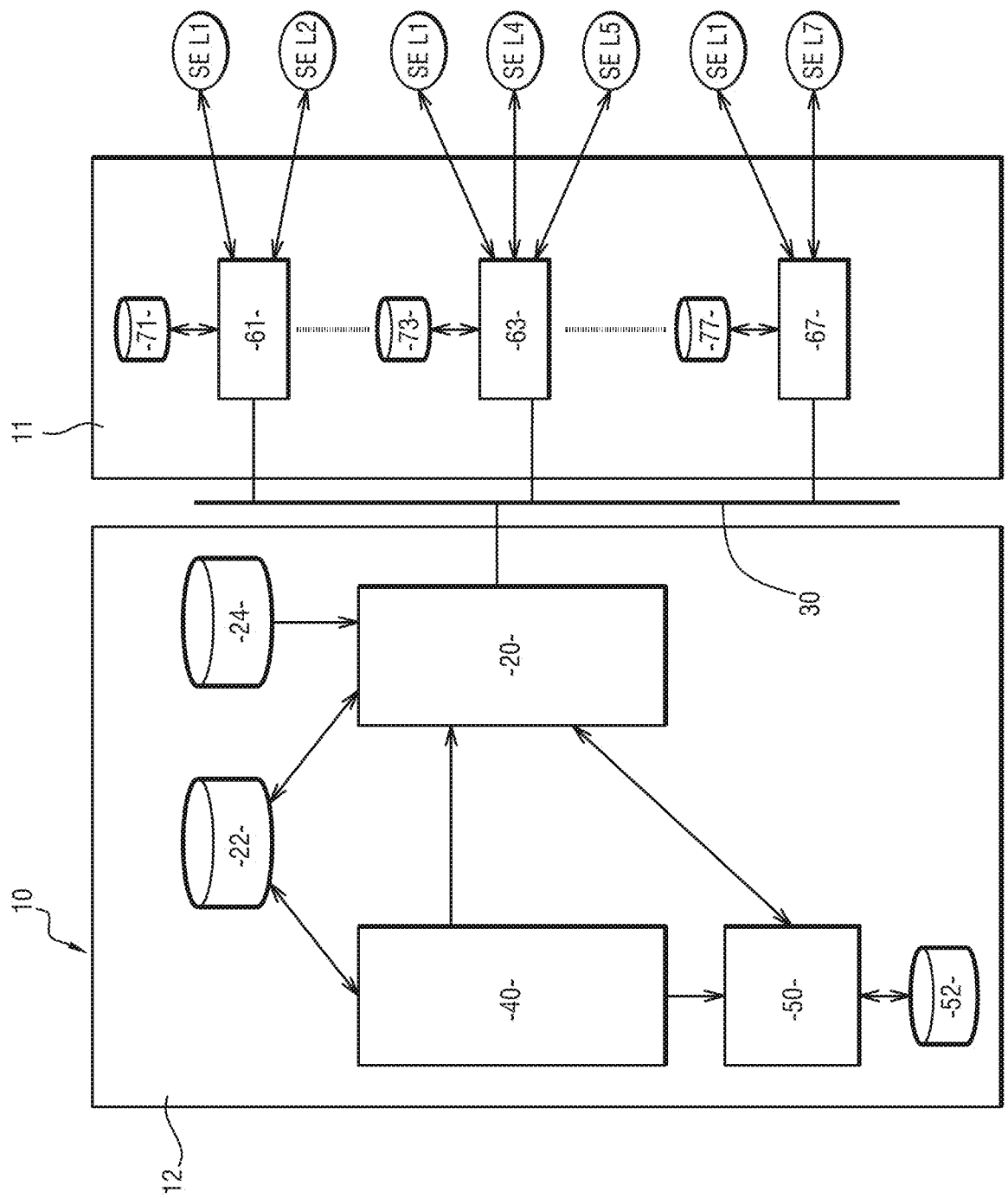
FIG. 2 is a schematic block diagram of supervision infrastructure of the multimodal network of FIG. 1.

Referring to FIG. 2, supervision infrastructure 10 allows for an overview of the traffic on the multimodal network 1 and synchronised optimisation of the operation of each of the monomodal networks L1-L7.

Generally, the supervision infrastructure 10 includes a first level 11 and a second level 12.

The first level 11, which is decentralised, includes a plurality of local supervision modules 61-67, with each local supervision module being associated with a traffic database 71-77.

Each local supervision module is associated with a hub station of the network 1. Thus, for example, for the network 1 of FIG. 1, which includes 7 hub stations H1-H7, the supervision infrastructure 10 includes 7 local supervision modules 61-67, and thus 7 traffic databases 71-77. In particular, the local supervision module 63, which is connected to the database 73, is associated with the hub station H3.

Each local supervision module is interfaced with the operating systems SE L1-SE L7 of the various monomodal networks interconnected at the associated hub station. Thus, for example, the local supervision module 63 is connected to the ATS system of the network L1, the EAS system of the network L4, and the ATS system of the network L5.

The second level 12, which is centralised, includes a global supervision module 20, an operational data management module 40, and an emergency management module 50. The second level 12 also includes a historical database 22, an operating rules database 24, and a scenario database 52.

The various local supervision modules are connected to one another and to the global supervision module 20 by means of a suitable communications network 30.

The function of the supervision infrastructure 10 is to generate instructions for the operation of each of the monomodal networks. These instructions are created based on traffic data obtained from each of the operating systems. An instruction is taken into account by the operating system of the monomodal network to which it is addressed as operating information to be taken into account dynamically in the generation of timetables.

The supervision infrastructure 10 thus provides external operating information to the individual operating system of the monomodal network in question. As such, the operating system modifies the timetable of a vehicle and/or the dynamics of its movement (i.e. by changing the speed of travel between two stations) whilst maintaining control over the operation of the monomodal network, particularly with regard to operating safety issues.

It should be noted that the various monomodal networks falling within the multimodal network must be based at least on the use of dynamic timetables, preferably dynamic timetables that may be adjusted with short lead times, typically on the order of seconds.

First Level

The function of the first level 11 is local monitoring of the traffic in the vicinity of each of the hub stations of the multimodal network and local control of the traffic in the vicinity of each hub station.

More specifically, a local supervision module, associated with a hub station, is suited to monitor the traffic on the various networks interconnected with the hub station in a monitoring area surrounding the hub station.

In FIG. 1, the monitoring area DS3 of the module 63 associated with the hub station H3 includes the stops 121-181 along the first track and 132-182 along the second track of the first network L1, the stops 411-431 of the first track and 412-432 of the second track of the fourth network L4, as well as the stops 511-541 of the first track and 512-542 of the second track of the fifth network L5.

Thus, a monitoring area includes the hub station with which it is associated and, for each track of the lines intersecting at the hub station, at least one station upstream of the hub station and at least one station downstream of the hub station; the terms 'upstream' and 'downstream' here relate to the direction of travel of the vehicles along the track in question.

The traffic data acquired by the module 63 thus relate to events occurring within the monitoring area.

A local supervision module is also suited to control the traffic on the various networks interconnected at the hub station in a control area surrounding the hub station.

In FIG. 1, the control area DC3 of the module 63 associated with the hub station H3 includes the stops 141-161 of the first track and 162-172 of the second track of the first network L1, the stops 411 and 421 of the first track and 422-432 of the second track of the fourth network L4, as well as the stops 511 and 521 of the first track and 522 and 532 of the second track of the fifth network L5.

Thus, in addition to the hub station with which it is associated, a control area includes, for each track of the lines intersecting at the hub station, at least one station upstream of the hub station in the direction of travel of the vehicles along the track in question.

The instructions generated by the module 63 thus allow for modification of the traffic within the control area DC3.

If two monitoring areas can overlap, the two corresponding local surveillance modules will acquire the traffic data relating to shared stops. Advantageously, the control areas are unconnected in order to avoid any instability in supervision that might result from contradictory instructions being delivered by two local monitoring modules.

For a single module, the control area is included within the monitoring area.

The control area of a local supervision module consists of the stops of the associated hub station and, for each monomodal network interconnected at this hub station, of one or more consecutive stops upstream of the hub station in the direction of travel of the vehicles.

Figure 3:
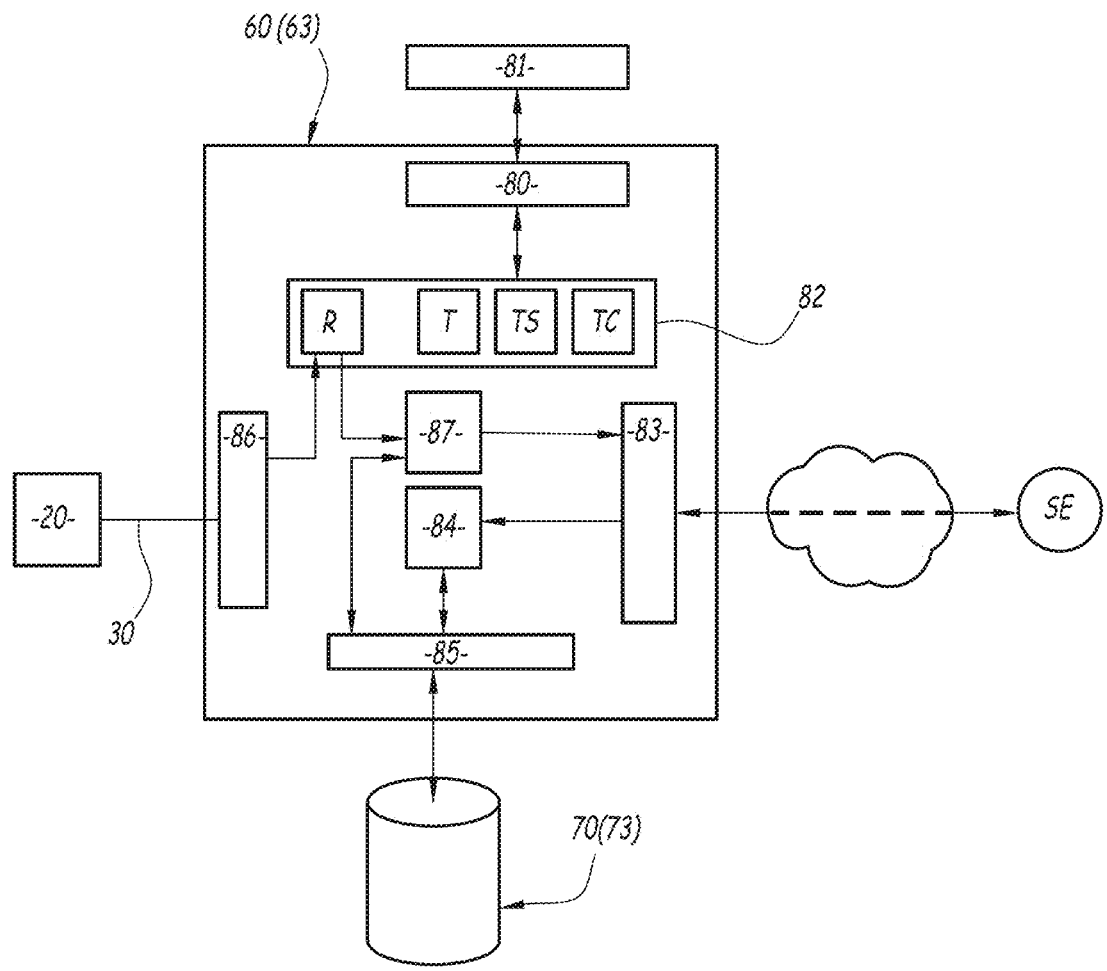
FIG. 3 is a schematic block diagram of a management module of an interchange station according to the invention that belongs to the infrastructure of FIG. 2.

Referring now to FIG. 3, a generic local supervision module 60 will be described. The modules 61-67 result from the configuration of this generic module 60 so as to meet supervision needs specific to each of the hub stations with which the modules are associated.

Thus, the module 60 includes means of configuration 80 that allow an operator to determine the values of a plurality of configuration parameters via a suitable user interface 81.

Firstly, these configuration parameters include a table of monomodal networks T that includes the identification of each of the monomodal networks interconnected at the associated hub station.

These configuration parameters also include a monitoring table TS that includes, for each monomodal network indicated in the table T, the identification of each of the stops of the network at which the traffic should be monitored.

Lastly, these configuration parameters include a control table TC that includes, for each network of the table T, identification of the stops of the network for which target usage information can be generated.

All of the values of these configuration parameters are stored, for example, in a RAM 82 of the module 60.

The monitoring table TS thus allows for the monitoring area DS around the hub station to be defined, and the control table TC allows for the control area DC around the hub station to be defined.

If necessary, the configuration means 80 include assistance functions (providing the operator with a list of the hub stations of the network; all monomodal networks intersecting at a selected hub station; the identification of all stops for a given monomodal network, etc.) and verification functions (e.g. to verify that the stops of the control table are also included in the monitoring table, that the stops of the control table are in fact upstream of the hub station, etc.).

The module 60 includes a first communication interface 83 to receive traffic data from one or more operating systems and to transmit instructions to one or more operating systems. For example, this is a connection interface with the Internet, by which the module 60 communicates with the operating systems of each of the monomodal networks.

Upon configuration, the module 60 reads the table T and, for each network ID in the table, subscribes to a service of the operating system of the network that is suited to transmit traffic data and receive usage information.

Advantageously, the module 60 reads the monitoring table TS and limits this subscription to the traffic data related to the stops indicated in the table TS for the network in question.

Advantageously, the module 60 reads the control table TC and limits this subscription to the usage information related to the stops indicated in the table TC for the network in question.

For this subscription, a bidirectional communication channel is established between the module 60 and each of the operating systems of the networks interconnected at the associated hub station.

For example, for each stop being monitored, the module 60 receives at least the following traffic data from the operating system:
 the estimated time of arrival (ETA) of the next vehicle at the stop in question as currently indicated by the timetable; and
 the minimum and maximum stopping times provided by the timetable for this vehicle.

The module 60 includes means 84 for providing an overview upstream of the first interface 83 that are suited to process the traffic data received in order to generate overview data. The processing carried out by the module 60 consist, in particular, of calculating overview data allowing for correlation between networks based on the traffic data related to each individual network. Thus, for example, traffic data concerning the departure time of a second vehicle from a hub station must be processed so as to translate it into overview data corresponding to a time constraint on the arrival time of a first vehicle at the hub station: For example, the transfer time necessary for a passenger to go from the arrival area of the first vehicle to the departure area of the second vehicle is taken into account.

The module 60 includes a second interface 85 that allows for read/write operations in the dedicated database to which it is connected.

The module 60 includes a third interface 86 for communication over the network 30, in particular to establish bidirectional communications with the global supervision module 20.

In particular, the module 20 transmits a set of operating rules to the module 60 that must be taken into account by the module 60 at a current time in order to supervise the traffic. These rules R are stored in the RAM 82 of the module 60.

An operating rule is a logical rule, e.g., a Boolean rule, defined by experts in operations.

In particular, a rule is based on one or more overview data. More specifically, a rule is a function of one or more overview data.

The module 60 includes an engine 87 for executing rules that is suited to read a set of rules stored in the memory 82 and execute them.

A set of rules is executed when an associated event occurs, typically the modification of the value of an item of traffic data within the database.

The execution of a set of rules is suspended when no rule of the set can be executed.

The result of the execution of a set of rules may consist of the generation of one or more instructions directed at the operating systems, an instruction including operational information that the recipient operating system must take into account.

For example, an instruction may consist of requesting an operating system to hold a vehicle when it stops at a stop on the network in order to ensure connection with a vehicle that is delayed.

For example, an instruction may consist of requesting the modification of the task assigned to a vehicle within the control area. The task modification may consist, e.g., of cancelling a stop or requiring an additional stop in order to adjust the arrival time of the vehicle at the hub station.

Second Level

The function of the second level 12 is to evaluate the overall situation on the multimodal network as a whole and to manage the multimodal network based on a transport plan.

The global supervision module 20 is configured to function in three possible modes.

In a first mode of operation ('nominal mode'), the module 20 selects, automatically or by the intervention of an operator, an operational profile of the multimodal network.

In the operational database 24, various profiles are associated with sets of operational rules that each of the modules 61-67 must execute when the profile in question is selected.

For example, the predefined profiles includes a 'peak' profile, in which the operational rules prioritise the flow of users (promoting circulation on a line used by a large number of users), an 'off-peak' profile, in which the operational rules allow for priority to be given to underserved stations (delaying a low-frequency train to allow passengers to make their connection), or an 'energy saving' profile (delaying a train not by holding it at a station but by limiting its speed between two stations).

The selection of a profile is based, for example, on the time of day in order to determine whether it is off-peak or peak, etc.

Once a profile has been selected, the associated rule sets are read from the database 24 and transmitted to each of the modules 61-67 for execution.

It should be noted that the sets of operational rules are predefined in the database 24. Each rule set results from an analysis of operations amongst the various operators of the multimodal network affected by the implementation of the corresponding rule set and the operator of the multimodal network.

In a second mode ('overload'), the supervision module 20 analyses the development of the behaviour of the network based on characteristic events.

More specifically, the operational data management module 40 is suited to determine a current status of the traffic on the multimodal network. The current status of the traffic may consist, for example, of a plurality of variables, each variable being associated with a load level at a point on the multimodal network.

To this end, the module 40 collects data from various sources of information. These data may be operational data supplied by the supervision systems of the monomodal networks, contextual operational data such as meteorological data, or monitoring data supplied by cameras. The various types of information are aggregated by the module 40 in order to obtain a current status.

The current status is stored in the historical database 22.

The module 40 is suited to compare the current status with a prior status so as to determine any changes in the current status of the traffic, in particular variations in the load level. Such change-of-state information is then compared with similar information stored in the historical database 22 so as to identify characteristic precursor events of a traffic overload situation.

The characteristic events thus identified are transmitted in real time to the global supervision module 20.

Depending on the type of characteristic event received, the module 20 is then suited to implement countermeasures in order to avoid saturation and avalanche phenomena.

These countermeasures consist of deploying new sets of operational rules on one or another of the modules 61-67 on a case-by-case basis. Here, too, these rules are predefined in the operational rule database 24.

These new operational rules, which are executed by the various local supervision modules, allow for the transport capacity of the multimodal network to be preserved to the greatest extent possible so as to avoid congestions that may cause a deterioration in the overall performance of the network.

This mode is intended to address malfunctions such as recurrent delays or traffic bottlenecks identified within the multimodal network.

In a third mode ('downgraded mode'), the global supervision module 20 supervises the multimodal network when part of it is unavailable, e.g. due to a transient incident or unavailability of infrastructure.

When the module 40 has identified a characteristic event indicating a failure, a situation file is transmitted to the module 50. Likewise, a module 60 may send the module 20 an indication of a major disturbance.

The database 52 includes various predefined reconfiguration scenarios for the multimodal network. Each scenario is associated with a situation file, and a situation file is associated with a plurality of possible reconfiguration scenarios. For example, if an overload is detected on a line at one station, the scenario may consist of avoiding the use of the corresponding mode of transport for a predetermined time, holding the vehicles of the line in question in upstream station, or deploying vehicles on a relief line.

The module 50 is then suited to analyse the effect of the implementation of each of the scenarios associated with the situation file in managing the malfunction detected. For example, a prospective algorithm is executed on each of these scenarios in order to determine the best option, taking into account the related operating parameters, e.g. reducing the reconfiguration time of the multimodal network or returning to normal traffic or resynchronising the various hub stations of the multimodal network.

The scenario that will result in maximising the capacity of the multimodal network is selected as the best possible scenario. The module 50 thus allows for the effect of the implementation of a scenario on the traffic status to be anticipated. The module 50 constitutes a decision-taking aid for the operator. The scenario allowing for the best response to the malfunction in terms of the traffic status is selected by the operator and transmitted to the global supervision module 20.

More precisely, because each scenario is associated with a plurality of operational rules in the database 52, the operational rules associated with the best scenario are transmitted by the module 20 to each of the modules 61-67 to be implemented by them in order to bring about an effective reconfiguration of the operation of the multimodal network, e.g. by making a section of a line of a monomodal network unusable, redefining the tasks and thus the timetables of the vehicles operating on the adjacent monomodal network(s), or by putting bypass lines or replacement vehicles to use.

Of course, complementary modes may be defined as needed.

Example of Operation

The set of operational rules that a local supervision module must execute at the current time is provided to it by the global supervision module 20 depending on the operational profile selected as described above for the multimodal network. It is this set of rules that defines the global traffic management mechanisms implemented by the local supervision modules 61-67.

For example, the module 63 must verify a set of operational rules allowing for synchronisation between the network L1 and the network L5 that intersect at the hub station H3.

Amongst the traffic data received by the module 63 from the operating system of the network L1, it periodically receives an estimate of the arrival time T1 of a first vehicle V1 operating on the first network L1 at the stop 161. The module 63 receives this information once the first vehicle enters the monitoring area DS3.

Amongst the traffic data received by the module 63 from the operating system of the network L5, it periodically receives an estimate of the arrival time T2 of a second vehicle V2 operating on the first network L5 at the stop 521. The module 63 receives this information once the second vehicle enters the monitoring area DS3.

The operating system of the network L5 also provides a maximum stopping time at the stop 521 such that the module 63 can determine a latest estimated departure time T3 from the stop 521 for the second train V2.

By subtracting the time necessary for a passenger to go from the stop 161 to the stop 521, the overview means of the module 63 calculates an arrival time interval T2* and T3* for the first vehicle that will allow passengers to make their connection with the second vehicle. This interval is an example of overview data, advantageously used in one or more rules to correlate traffic amongst the various monomodal networks under supervision.

At each update of T1 or T2* or T3*, a set of rules are executed.

If the ETA T1 is less than T2*, it is then possible for a user to make the connection and go from the first vehicle to the second vehicle. Thus, the module 63 does not generate any particular instruction.

If, on the other hand, the ETA T1 is greater than T2* but less than T3*, the passengers may make their connection provided that the second train is held at the station. As a result, the module 63 generates an instruction for the operating system of the network L5 including operational information indicating that the departure time of the second vehicle V2 must be delayed. For example, this operational information includes a duration corresponding, e.g., to the difference of T1−T2*.

Lastly, if the estimated time T1 is not only greater than T2* but also to T3*, this means that the first train is substantially delayed such that it will not be possible to hold the second vehicle at the station without exceeding the latest departure time T3 and risking disturbances on the network L5.

To allow passengers of the first vehicle V1 to make their connection without excessively delaying the departure of the second vehicle V2, the module 63 generates an instruction for the operating system of the network L1 that consists of modifying the task of the first vehicle V1 such that it does not stop at the stop 451 upstream of the station H3. In this way, the arrival time T1 of the first vehicle V1 at the station H3 is moved up to be at least before the time T3*.

An instruction is also transmitted to the operating system of the network L5 to delay the departure of the second vehicle V2, whilst remaining within the authorised interval predetermined by the timetable.

Lastly, advantageously, an instruction is also transmitted to the operating system of the network L1 to modify the task of a third vehicle V3 that follows the first vehicle V1 so that it will stop at the stop 451.

If the module 63 cannot hold the second vehicle V2 in order to ensure the connection, the second vehicle V2 will depart. The module 63 transmits the fact that a set of operational rules has not been complied with to the global supervision module 20. The module 20 must then analyse the causes of this malfunction and, if necessary, deploy a new set of operational rules so as to better manage the traffic and ensure the connection between these two monomodal networks.

With each modification of the instruction concerning the departure time of the second vehicle V2, these data are propagated to the other local supervision modules so that they can update their databases when such data are relevant to the operational rules implemented by them.

When the second vehicle V2 actually leaves the station H3, the module 63 ceases to update and transmit the instruction on the corrected departure time of the second vehicle V2 to the other local supervision modules and the operating system of the network L5.

Different types of rules or groups of rules may be implemented to dynamically modify the timetables, redefine the task of a vehicle, modify the dynamics of a vehicle between two stations, etc. More generally, an instruction may be generated by a rule or group of rules to influence any of the variables that a particular operating system is capable of adjusting.

What is claimed is:

1. A supervision infrastructure of a multimodal terrestrial transport network, wherein the multimodal terrestrial transport network includes at least one first monomodal network and a second monomodal network, wherein each of the first and second monomodal networks is equipped with an individual operating system, wherein the supervision infrastructure comprises a plurality of first computers, each first computer being associated with a corresponding interchange station, where lines of the first and second monomodal networks are interconnected so as to allow passenger to transfer between a first vehicle circulating on the first monomodal network and a second vehicle circulating on the second monomodal network, wherein each first computer is configured to:

by a first communication interface, communicate with the operating systems of the first and second monomodal networks;

provide an overview of the traffic in a monitoring area associated with each first computer and cover the first and second monomodal networks at least around the corresponding interchange station, so as to update the overview data based on traffic data provided by the operating systems of the first and second monomodal networks; and execute operating rules based on the overview data and generate an instruction including operating information so as to modify the traffic within a control area associated with each first computer, wherein the first communications interface transmits the instruction to one of the operating systems of the first and second monomodal networks, wherein each first computer is configured from a generic first computer based on a function of the corresponding interchange station with which each first computer is associated, wherein the corresponding interchange station is associated with the monitoring area, and the traffic data acquired by each first computer relates to events occurring within the monitoring area, and wherein the corresponding interchange station is associated with the control area and the instructions generated by each first computer provide for modification of the traffic within the control area.

2. The supervision infrastructure according to claim 1, including a second communication interface for communicating with a second computer of the supervision infrastructure, the second communication interface receiving the operating rules to be executed by the engine at the current time.

3. The supervision infrastructure according to claim 1, for which an operating rule consists of generating the instruction that the second vehicle be held at the interchange station until the first vehicle has arrived at the interchange station, provided that the hold time of the second vehicle does not exceed a latest departure time, determined by a timetable according to which the operating system of the second monomodal network manages the traffic on the second monomodal network.

4. The supervision infrastructure according to claim 3, wherein an operating rule is a logical rule that is a function of at least one of overview data.

5. The supervision infrastructure according to claim 1, wherein the monitoring area of the interchange station includes the interchange station and, for each track of the lines interconnected at the interchange station, at least one station upstream of the interchange station and at least one station downstream of the interchange station in the direction of travel of the vehicles along the track.

6. The supervision infrastructure according to claim 5, wherein the control area of the interchange station includes the interchange station and, for each track of the lines interconnected at the interchange station, at least one station upstream of the interchange station in the direction of travel of the vehicles along the track.

7. The supervision infrastructure according to claim 1, wherein the monitoring area of the interchange station includes the interchange station and, for each track of the lines interconnected at the interchange station, at least one station upstream of the interchange station and at least one station downstream of the interchange station in the direction of travel of the vehicles along the track, wherein the interchange station is associated with the control area and the instructions generated by the local supervision module allows for modification of the traffic within the control area, wherein the control area of the interchange station includes the interchange station and, for each track of the lines interconnected at the interchange station, at least one station upstream of the interchange station in the direction of travel of the vehicles along the track, and wherein the control area is included within the monitoring area.

* * * * *